(12) United States Patent
Lee et al.

(10) Patent No.: US 12,379,974 B2
(45) Date of Patent: Aug. 5, 2025

(54) DATA RACE DETECTION WITH PER-THREAD MEMORY PROTECTION

(71) Applicant: Microsoft Technology Licensing, LLC, Redmond, WA (US)

(72) Inventors: Sangho Lee, Bellevue, WA (US); Adil Ahmad, West Lafayette, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/082,444

(22) Filed: Dec. 15, 2022

(65) Prior Publication Data

US 2023/0119005 A1    Apr. 20, 2023

Related U.S. Application Data

(62) Division of application No. 16/752,470, filed on Jan. 24, 2020, now Pat. No. 11,556,395.

(51) Int. Cl.
| | |
|---|---|
| G06F 9/52 | (2006.01) |
| G06F 9/54 | (2006.01) |
| G06F 11/362 | (2025.01) |
| G06F 12/084 | (2016.01) |
| G06F 12/10 | (2016.01) |

(52) U.S. Cl.
CPC .............. *G06F 9/526* (2013.01); *G06F 9/544* (2013.01); *G06F 11/3624* (2013.01); *G06F 11/3632* (2013.01); *G06F 12/084* (2013.01); *G06F 11/3636* (2013.01); *G06F 12/10* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,870,545 B2 * | 1/2011 | Saha ....................... | G06F 9/467 |
| | | | 718/107 |
| 7,899,997 B2 * | 3/2011 | Michael .................. | G06F 9/466 |
| | | | 711/150 |
| 9,135,082 B1 * | 9/2015 | Sheng ..................... | G06F 11/36 |

(Continued)

FOREIGN PATENT DOCUMENTS

WO     2012101538 A1     8/2012

OTHER PUBLICATIONS

"Notice of Allowance Issued in European Patent Application No. 20829276.3", Mailed Date: May 17, 2023, 8 Pages.

(Continued)

*Primary Examiner* — Abu Zar Ghaffari
(74) *Attorney, Agent, or Firm* — Schwegman Lundberg & Woessner, P.A.

(57) ABSTRACT

Data race detection in multi-threaded programs can be achieved by leveraging per-thread memory protection technology in conjunction with a custom dynamic memory allocator to protect shared memory objects with unique memory protection keys, allowing data races to be turned into inter-thread memory access violations. Threads may acquire or release the keys used for accessing protected memory objects at the entry and exit points of critical sections within the program. An attempt by a thread to access a protected memory object within a critical section without the associated key triggers a protection fault, which may be indicative of a data race.

20 Claims, 11 Drawing Sheets

(56) References Cited

U.S. PATENT DOCUMENTS

| | | | |
|---|---|---|---|
| 9,524,196 B2* | 12/2016 | Gschwind | G06F 9/528 |
| 2003/0115476 A1* | 6/2003 | McKee | G06F 9/52 |
| | | | 713/193 |
| 2005/0246505 A1* | 11/2005 | McKenney | G06F 9/52 |
| | | | 711/151 |
| 2005/0283781 A1* | 12/2005 | Karp | G06F 11/3624 |
| | | | 718/100 |
| 2006/0271938 A1* | 11/2006 | Gootherts | G06F 9/461 |
| | | | 718/107 |
| 2007/0186215 A1* | 8/2007 | Rajwar | G06F 12/1475 |
| | | | 712/E9.05 |
| 2009/0199162 A1* | 8/2009 | Choi | G06F 11/3632 |
| | | | 717/124 |
| 2010/0100690 A1 | 4/2010 | Rajamani et al. | |
| 2010/0107167 A1* | 4/2010 | Chen | G06F 9/526 |
| | | | 712/220 |
| 2011/0246993 A1* | 10/2011 | Moir | G06F 9/467 |
| | | | 711/147 |
| 2013/0042080 A1 | 2/2013 | Waddington | |
| 2013/0290583 A1* | 10/2013 | Dice | G06F 9/526 |
| | | | 710/200 |
| 2013/0290967 A1* | 10/2013 | Calciu | G06F 9/526 |
| | | | 718/102 |
| 2014/0289839 A1* | 9/2014 | Chen | H04L 63/0807 |
| | | | 726/9 |
| 2016/0246641 A1* | 8/2016 | Kogan | G06F 3/0629 |
| 2016/0364315 A1* | 12/2016 | Lee | G06F 11/3632 |
| 2017/0286326 A1* | 10/2017 | Guim | G06F 12/1009 |
| 2018/0060244 A1* | 3/2018 | Godard | G06F 9/00 |
| 2019/0377694 A1* | 12/2019 | Muthukrishnan | G06F 12/1441 |
| 2020/0014688 A1* | 1/2020 | Kohli | H04L 9/0891 |
| 2021/0191788 A1* | 6/2021 | Dice | G06F 9/3851 |

OTHER PUBLICATIONS

"Decision to Grant Issued in European Patent Application No. 20829276.3", Mailed Date: Aug. 10, 2023, 02 Pages.

Communication pursuant to Rules 70(2) and 70a(2) EPC and reference to Rule 39(1) received in European Application No. 23185246.8, mailed on Jan. 22, 2024, 2 pages.

European Search Report received for EP Application No. 23185246.8, mailed on Dec. 15, 2023, 9 pages.

* cited by examiner

DATA RACE DETECTION WITH PER-THREAD MEMORY PROTECTION

CLAIM OF PRIORITY

This application is a divisional application of U.S. patent application Ser. No. 16/752,470, filed Jan. 24, 2020, which application is incorporated herein by reference in its entirety.

TECHNICAL FIELD

The disclosed subject matter relates to computer systems, software tools, and methods for detecting data races in multi-threaded program execution.

BACKGROUND

Multi-threaded programs are often impaired by data races—a class of concurrency bugs that occur when multiple threads simultaneously access the same data memory location and at least one of those accesses is a write operation. Data races are frequently the root cause of concurrency bugs such as atomicity and order violations, and they have had serious real-world consequences, including, e.g., the Northeastern blackout in 2003, the Nasdaq glitch during Facebook's IPO in 2012, and vulnerability to concurrency attacks on computer systems over the years.

To facilitate debugging multi-threaded programs and avoiding data races, various dynamic data race detectors have been proposed. Such detectors monitor the concurrency behavior of the program during runtime by tracking all or some sampled memory read and write events, depending on the class of data race detector, e.g., to determine whether memory access order is properly enforced by synchronization ("happens-before algorithms"), whether memory accesses are consistently protected by common locks ("lockset algorithms"), or whether read-write conflicts occur during runtime ("conflict exception detection algorithms"). State-of-the-art tools such as GOOGLE®'s Thread Sanitizer and INTEL®'s Inspector XE, for example, instrument all memory operations in a program to check whether they can cause or have caused race conditions during actual execution. However, due to their use of inefficient mechanisms to instrument individual memory accesses, these tools incur prohibitive runtime overheads, rendering them largely ineffective outside certain development and testing contexts. Sampling or custom-hardware-based approaches that have been proposed to mitigate the dramatic slowdown, on the other hand, tend to significantly impair coverage and deployability.

DETAILED DESCRIPTION

Figure 1:
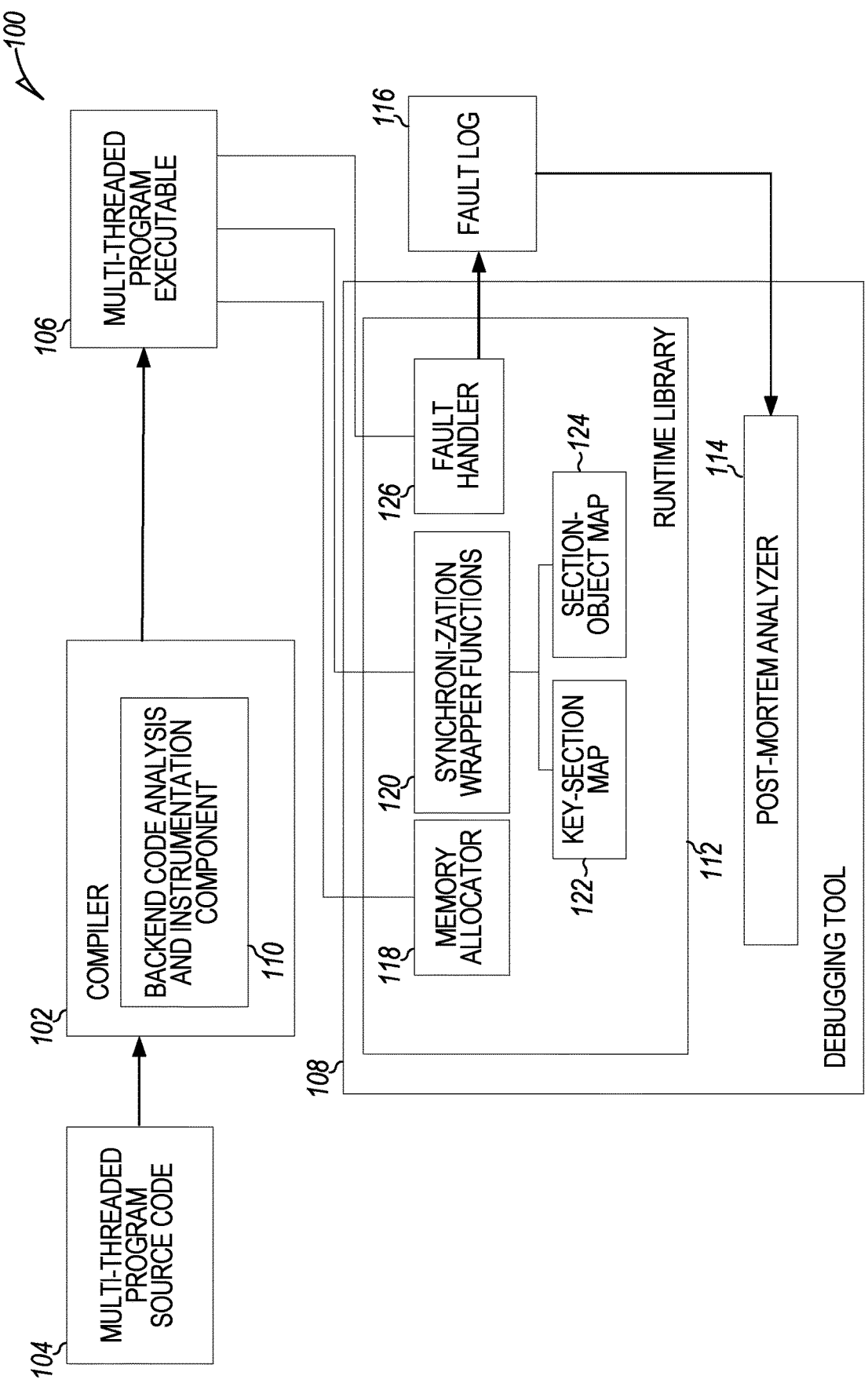
FIG. 1 is a block diagram of an example software system for multi-threaded program execution with data race detection, in accordance with various embodiments.

Described herein is an efficient dynamic data race detector for multi-threaded programs, implemented in software executed on a computer system, e.g., as part of a debugging tool. Multi-threaded programming allows different parts of a program to be executed simultaneously in different respective threads that share resources of the same central processor or processor core, and can result in data races if the program contains any synchronization errors. In accordance herewith, such errors can be identified with a debugging tool that leverages a commodity hardware feature called "per-thread memory protection" to protect memory objects shared between threads (herein also "shared variables") and turn data races into inter-thread memory access violations.

Per-thread memory protection operates at the level of memory pages, allowing individual threads to have different access permissions (e.g., no access, read-only access, and read/write access), a.k.a. "views," for the same memory page and change these views with little overhead. A "memory page," as commonly understood, is a fixed-length contiguous block of virtual memory that constitutes the smallest unit of data for memory management. Per-thread memory protection utilizes a fixed number of protection keys (e.g., in currently available implementations, 16 keys corresponding to 16 different numerical values), and allows assigning each memory page one of these keys; memory pages tagged with the same protection key constitute a "protection domain." Local thread registers store the access permissions associated with the protection domains separately for each thread.

In various embodiments, memory allocation for shared memory objects involves mapping each such shared memory object to its own unique virtual page address; in this manner, memory protection at the granularity of individual shared memory objects can be achieved. (Optionally, for efficient physical-memory usage, a technique called "page aliasing" is used to consolidate multiple virtual pages in the same physical page, avoiding overlap between the allocations for different memory objects by using different virtual page offsets.) Further, since the number of available protection keys is limited, scalability (that is, in this context, the ability to protect a greater number of shared memory objects than there are keys) is achieved, in accordance with various embodiments, by grouping shared memory objects and assigning the same protection key to objects within a given group (that is, to the virtual pages in which these objects are stored). To avoid the large numbers of false positives and false negatives in data race detection that would likely result from an arbitrary grouping, the grouping may be tied to critical sections accessing the memory objects, a "critical section" herein being understood to be a lock-protected code segment, which can be executed by only one thread at a time (explained in more detail below). In various embodiments, the (in any case small) overhead associated with updates of protection domains and/or access permissions is minimized by minimizing the frequency of protection-key assignments or reassignments and limiting view updates for the threads largely to critical-section entry and exit.

The disclosed data race detector takes advantage of memory protection technology to turn data races into interthread access violations using an approach herein termed "key-enforced access." In simple terms, key-enforced access means that a thread can acquire the protection key assigned to a given shared variable if and only if no other thread holds the key (by virtue of earlier acquisition), and access to a shared variable without the requisite key constitutes an access violation that raises an "exception" or "fault" resulting in termination or at least interruption of the program. The memory protection key, used in this manner to control access to a shared variable, is herein also referred to as an "access key." Contrary to a lock, which is used to prevent execution, by more than one thread at a time, of a critical section to which the lock is assigned, and which is only loosely coupled with the shared variables in the critical section (e.g., allowing a lock to be associated with multiple shared variables and a shared variable to be associated with multiple locks, and not necessarily preventing the shared variable from being accessed by a thread without a lock), an access key is dedicated to a specific variable in that, once assigned to the variable, the access key generally (i.e., except in limited circumstances, detailed below) stays with that variable, regardless of the critical section from which it is accessed. When entering a critical section, a thread acquires any key(s) assigned to shared variables within the section, provided they are free (i.e., not held by another thread); upon exit of the critical section, the thread releases the key(s).

The foregoing will be more readily understood from the following detailed description of various embodiments, in particular, when taken in conjunction with the accompanying drawings.

Figure 11:
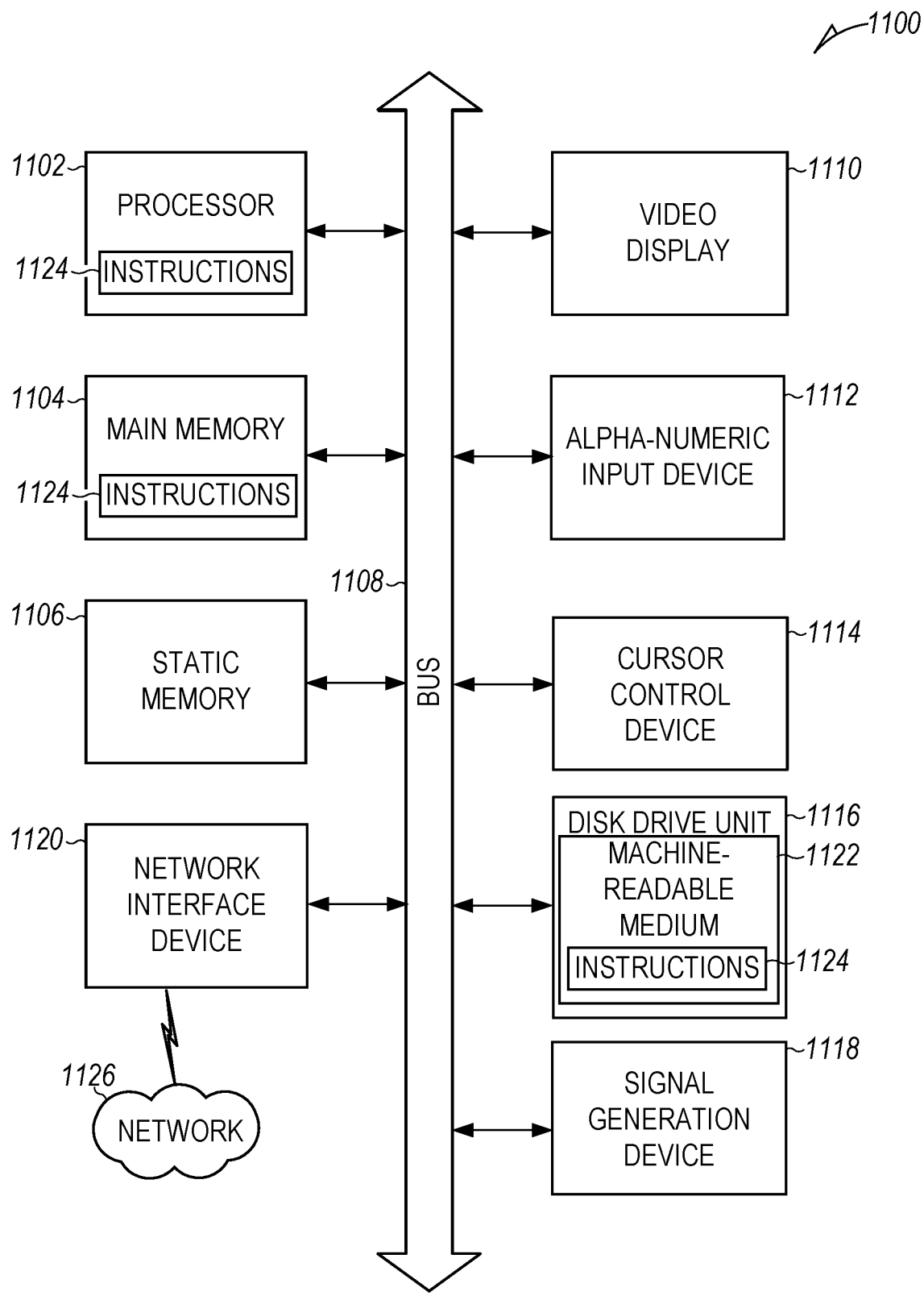
FIG. 11 is a block diagram of an example computing system as may be used to implement the system of FIG. 1, in accordance with various embodiments.

FIG. 1 is a block diagram of an example software system 100 for multi-threaded program execution with data race detection, in accordance with various embodiments. The various components of the software system 100 (which may include instructions as well as data structures), may be stored on one or more computer-readable media (such as, without limitation, permanent, non-transitory data storage devices such as a hard disk or CD-ROM). In use, components of the software system 100 are generally stored in main memory (e.g., random access memory (RAM)) and executed by a general-purpose computer processor (with per-thread memory-protection capability) of a computing system, as such forming part of the computing system. The computing system may include hardware such as, in addition to the processor (or multiple processors) and memory, one or more permanent data storage devices, input/output devices (e.g., a keyboard, mouse, and display device), network interface(s), etc., as well as a system bus connecting the various other hardware components; an example such system is depicted in FIG. 11.

The software system 100 includes a compiler 102 for converting source code 104 of a multi-threaded program into a corresponding multi-threaded program executable 106, as well as a debugging tool 108 for testing and identifying errors in the program. In accordance with various embodiments, the compiler 102 and debugging tool 108 are augmented with various components collectively facilitating data race bug detection, such as a backend component 110 for code analysis and instrumentation, a runtime library 112 for dynamic analysis and logging during program execution, and an (optional) post-mortem analyzer 114 for extracting potential data races from the generated log 116. The backend code analysis and instrumentation component 110 includes a list of rules and code segments that the compiler 102 can substitute in for various source-code segments. The runtime library 112 and post-mortem analyzer 114 may be integrated with other debugging functionality (not shown) (such as, e.g., a conventional debug engine for detecting other types of bugs, a user interface allowing human review of detected bugs and their associated process context (including variables, lines of codes, etc.), a debug manager for managing the debugging of multiple programs or processes, etc.) in various ways, e.g., by embedding code in, or providing suitable interfaces with, existing debugging software (e.g., Visual Studio debugger, gdb, lldb). Further, in some embodiments, the debugging tool 108 and compiler 102 may be parts of a larger software suite. For example, in some embodiments, the debugging tool 108 is implemented, along with the compiler 102, using the LLVM 7 compiler suite. The various components of the software system 100 may be written in any one or more suitable programming languages. For example, in some embodiments, the instructions of components 110, 112, 114, which provide the data race detection capability, are written in C/C++. The post-mortem analyzer 114 may, alternatively, be written in C#, Java, Python, Perl, etc.

To render the program behavior of a multi-threaded program (as represented in FIG. 1 by source code 104 and executable 106) independent of the particular scheduling of threads (which may vary between execution instances), certain critical sections—meaning program segments that should not be simultaneously executed by multiple threads—are often protected by "locks." A lock is a synchronization object used for mutual exclusion: it can be held by no more than one thread at a time. To begin execution of a critical section, a thread first acquires the requisite lock (which it can do only if no other thread holds the lock), and upon exiting the critical section, the thread releases the lock, rendering the lock available for subsequent acquisition by other threads.

While locks prevent the simultaneous execution of a critical section by multiple threads, they do not preclude simultaneous access to a shared variable by multiple threads if that shared variable is accessible from within multiple critical and/or non-critical sections. To detect such instances of potential concurrent access to shared memory objects, the individual shared memory objects are, in accordance herewith, protected by memory protection keys serving as access keys. For this purpose, the program source code 104 is "instrumented"—that is, augmented and/or modified—during compilation to cause the executable 106 to call, at runtime, certain custom functions and routines to manage memory allocation and access-key assignments for the shared variables, access-key acquisition/release by the threads, and fault handling for memory access violations. Specifically, the backend code analysis and instrumentation component 110 may, in respective compiler passes, locate memory allocations for shared memory objects (i.e., global and heap variables) and replace them with calls to a custom memory allocator, and locate synchronization functions (e.g., locking/unlocking functions that define the beginning and end of critical sections) and replace them with custom wrapper functions that provide, in addition to the locking functionality, domain protection enforcement via the protection keys.

The runtime library 112 includes the custom memory allocator 118, which maps each shared memory object to a unique memory page, as well as the synchronization wrapper functions 120, which control the acquisition and release of access keys by the threads during critical-section entry and exit. The runtime library 112 may track the key assignments to the threads and/or the respective critical sections they execute as a function of time in a key-section map 122 and list protected shared memory objects for each section in a section-object map 124. These maps 122, 124 can be consulted by the synchronization wrapper functions 120 to determine which key(s) a thread may need to access variables within a critical section it is entering and whether these keys are available (i.e., not held by other threads for accessing the shared variables in other sections). The wrapper functions 120 also updates the maps 122, 124 whenever threads enter or exit critical sections. The runtime library 112 further registers a custom fault handler 126 to redirect to itself all protection faults raised by the program upon access attempts by a thread to a protected variable whose key the thread does not hold. The fault handler 126 may record the protection faults in the log 116, optionally after filtering out false alarms (i.e., protection faults unrelated to data races), and/or take further action directing how the program proceeds (if at all), e.g., by reassigning access keys. The post-mortem analyzer 114 may operate on the data stored in the fault log to perform further automated pruning of the protection faults, e.g., to eliminate redundant or non-racy access violations.

As will be understood by those of ordinary skill in the art, although the various components of the software system 100 operate in conjunction to provide data race detection functionality, they need not necessarily be executed on a single computer. For instance, instrumentation and compilation of the program source code 104 to create the program executable 106 by the compiler 102 and backend code analysis and instrumentation component 110 on the one hand, and subsequent debugging of the executable program 106 using the runtime library 112 on the other hand, may, in principle, take place on different computers.

Figure 2:
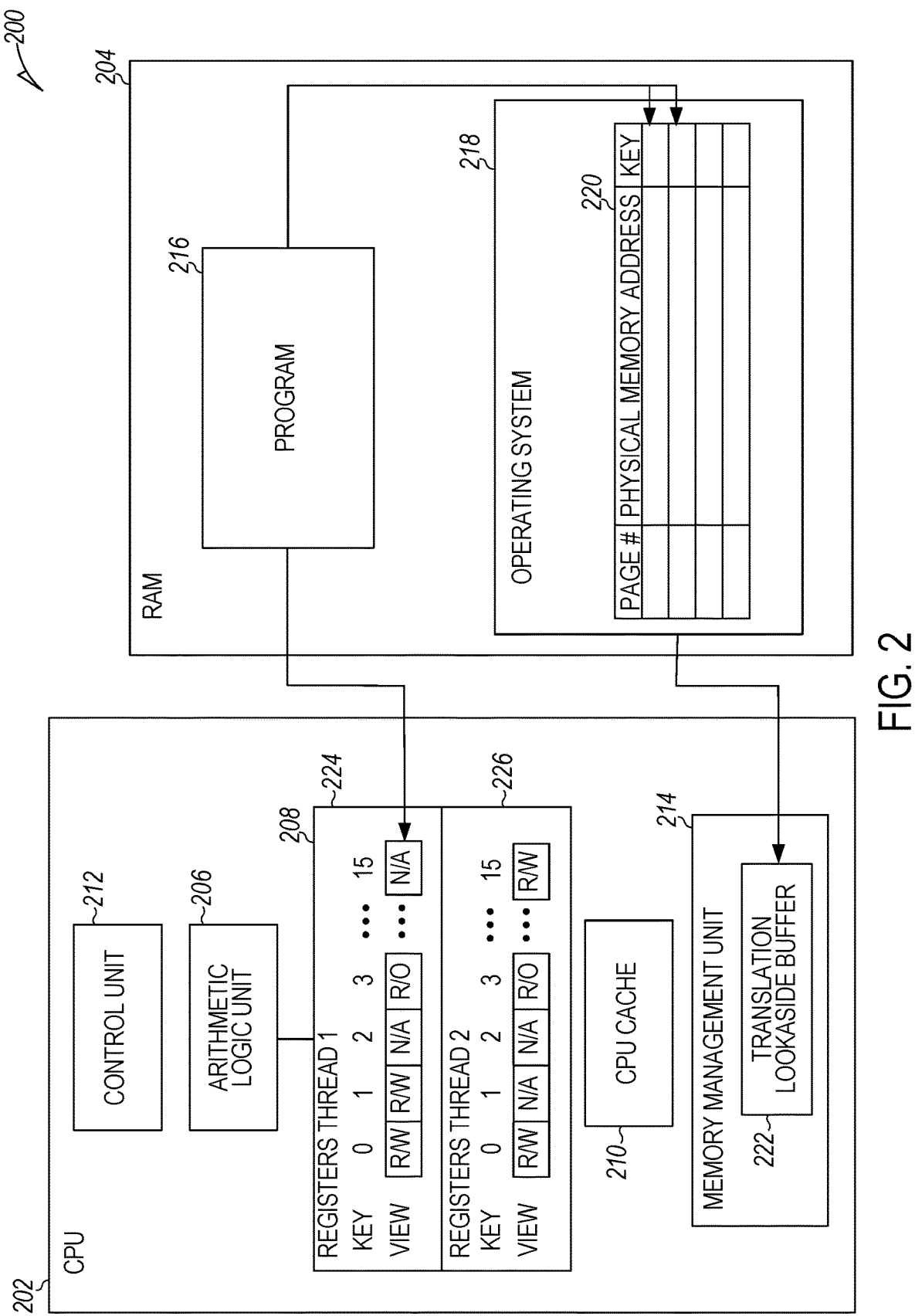
FIG. 2 is a block diagram of an example architecture of a processor and associated memory with per-thread program protection capability as used in accordance with various embodiments.

With reference now to FIG. 2, an example architecture 200 of a computer processor (i.e., central processing unit (CPU)) 202 and associated computer memory (e.g., RAM) 204 with per-thread memory protection capability, as used in accordance with various embodiments, is illustrated in simplified form. The CPU 202 includes a combinational logic circuit known as the arithmetic logic unit (ALU) 206 that executes mathematical/logical and other operations, operating on inputs stored in the internal CPU registers 208 and/or in memory 204. Further, the CPU 202 includes CPU cache 210, which stores copies of instructions and data from frequently used memory locations to provide faster access, and a control unit 212 that directs the operation of other CPU components and their interactions with the memory 204 and input/output devices (not shown). In addition, the CPU 202 has a memory management unit (MMU) 214 that facilitates virtual memory management by translating virtual memory addresses (or "page numbers"), that is, the logical addresses referenced in programs (e.g., program 216 stored in memory 204), into physical memory addresses and providing memory protection and paging capabilities. The mapping between virtual memory pages (which are contiguous blocks of memory of a fixed size, e.g., 4 kB) and their respective physical locations in RAM 204 is stored by the operating system 218 in kernel-owned memory as a "page table" 220. The MMU 214 stores a recent cache of the page table 220 knowns as the translation lookaside buffer (TLB) 222.

To achieve performance increases in program execution, the CPU 202 supports, in accordance herewith, multi-threading. When executing a multi-threaded program, the processor switches between the multiple threads in executing instructions, e.g., interleaving instructions from the multiple threads in a predetermined manner or switching, upon stalling of an active thread, to another. In this way, processor idle time is reduced. While the threads share processor resources such as the ALU 206, CPU cache 210, and MMU 214, each thread generally has its own set of CPU registers 208; for example, in FIG. 2, registers 208 are depicted as including registers 224 for a first thread and registers 226 for a second thread. The number of threads and associated register sets can, of course, be greater than two.

The data race detection tool described herein exploits per-thread memory protection as is provided, e.g., in Intel's Xeon Scalable processors. For purposes of illustration, this disclosure references various specifics of Intel's memory protection key (MPK) technology. It is to be understood, however, that processors other than Xeon Scalable or Intel processors may provide similar memory protection functionality, which may likewise be amenable to the general approach to data race detection described herein, with adaptations, if needed, apparent to and readily implemented by those of ordinary skill in the art without undue experimentation. For example, IBM and ARM provide processors with similar memory protection functionality. Accordingly, embodiments are not limited to implementation with any particular type of processor, but can utilize any processor with suitable multi-threading and memory protection capability.

Intel MPK, as used in various embodiments, provides sixteen different protection keys. One of the keys may be public by default for backward compatibility, leaving fifteen keys available for memory protection. Each memory page can be assigned one of these (fifteen) keys. The assigned keys are stored in the page table 220 (and TLB 222) as auxiliary information along with the mappings between page numbers and physical memory addresses. With sixteen supported protection keys, a key takes up four bits in the page table entry for the memory page to which it is assigned. MPK allows a program 216 to assign protection keys to memory pages using a system call (pkey_mprotect( )). Access permissions can be set, separately for each thread, for each group of memory pages sharing the same protection key. These access permissions (i.e., views) are stored in thread-local CPU registers 224, 226, using two bits to signify whether a given thread has access (and, if so what type of access) to the memory pages protected by a given key. For example, as illustrated in FIG. 2, thread 1 may have read/write access ("R/W") to memory pages protected by key 1 whereas thread 2 has no access to these pages ("N/A"), and threads 1 and 2 may both have read-only access to memory pages protected by key 3. Intel MPK technology allows the access permissions to be changed in the registers 224, 266 by userspace processes such as program 216, using non-privileged instructions for reading or writing to the registers (rdpkru and wrpkru, respectively). Beneficially, updating the access permissions does not affect the page table 220 and TLB 222, ensuring fast execution times (e.g., around 20 clock cycles). (IBM and ARM processors have similar memory protection functionality, but use privileged registers, which can be updated with system-call invocations.)

Figure 3:
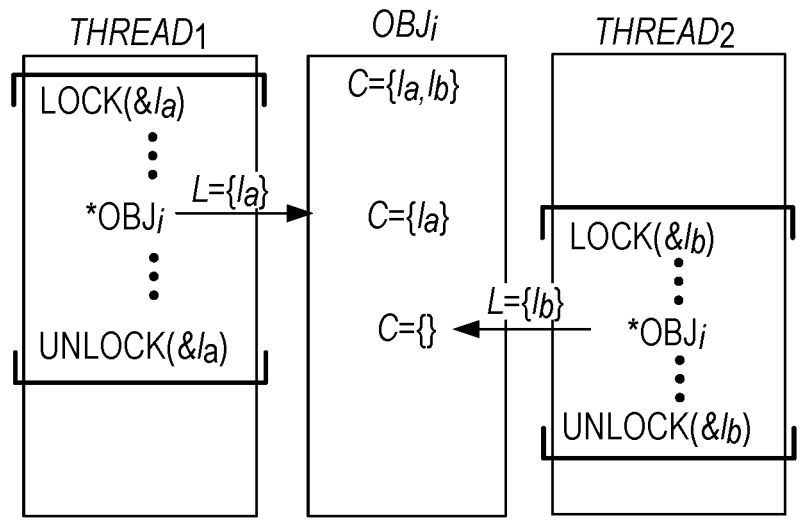
FIG. 3 is a conceptual diagram illustrating a lockset algorithm for data race detection.
Figure 4:
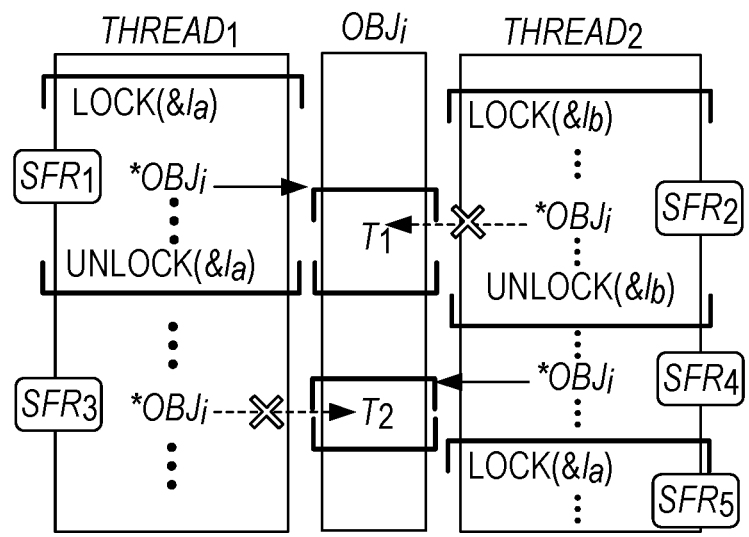
FIG. 4 is a conceptual diagram illustrating a conflict exception algorithm for data race detection.
Figure 5:
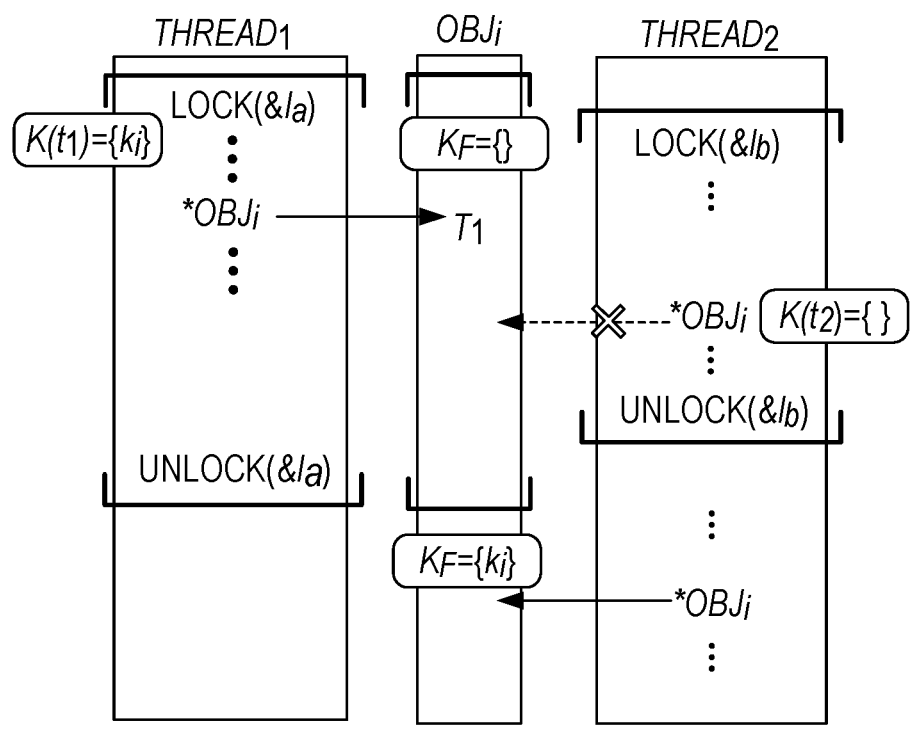
FIG. 5 is a conceptual diagram illustrating a key-enforced access algorithm for data race detection in accordance with various embodiments.

Before explaining in some detail the operations of an example data race detection method that exploits per-thread memory protection, multiple data race detection algorithms are now described conceptually with reference to FIGS. 3-5. FIG. 5 illustrates data race detection by key-enforced access (using per-thread memory protection) in accordance with various embodiments of the inventive subject matter, whereas FIGS. 3 and 4 illustrate, for comparison, the traditional lockset and conflict exception algorithms. The algorithms are each explained with the example of two threads (thread 1 and thread 2) accessing or attempting to access the same memory object i at different times (time going, in the figures, in the direction from the top of the page to the bottom of the page).

The lockset algorithm, depicted in FIG. 3, is a data race detection approach that determines whether every shared memory object is consistently protected by a common lock (or common locks) during program execution. For each shared variable v, the lockset algorithm maintains a candidate set C(v) of all locks that may be used to protect v. C(v) is initialized with a set of all locks of the program when v is created. For each thread t, the lockset algorithm maintains a lock set L(t) that the thread currently holds. A lock l is added to or removed from L(t) when thread t acquires or releases it. Whenever thread t accesses v, the lockset algorithm updates C(v) with the intersection of the current candidate set C(v) and the lock set L(t), according to $C(v) \rightarrow C(v) \cap L(t)$, to identify which common locks are consistently used to protect v (i.e., which locks are commonly held by all threads accessing v at their respective access times). If C(v) becomes Ø, meaning that a thread attempting access to v does not hold any lock previously held by every other thread that accessed t, the lockset algorithm considers v to have a data race problem. In the example of FIG. 3, the candidate set for object i is initialized with two locks, $C=\{l_a, l_b\}$. When thread 1, holding (only) lock $l_a$, accesses object i, the candidate set is reduced to $C=\{l_a\}$. Subsequently, when thread 2, holding (only) lock $l_b$, which is no longer in the candidate set C, access object i, no common lock protects object i, causing logging of a (potential) data race. Beneficially, the lockset algorithm is not sensitive to thread scheduling. However, it can suffer from many false positives and incur a ten- to thirty-fold slow-down (without custom hardware or Java Virtual Machine (JVM)).

The conflict exception algorithm, depicted in FIG. 4, is a data race detection approach that monitors shared variables for concurrent (and conflicting) accesses by multiple "synchronization-free regions (SFR)." An SFR is any code segment separated by consecutive synchronization primitives, such as lock or unlock functions. Thus, critical sections, for instance, are SFRs, as are the non-critical code sections between the end of one critical section and the beginning of the next critical section. When a thread t within an SFR r accesses a shared variable v, the conflict exception algorithm starts monitoring v to detect any conflicting access from other threads until t exits from r. In the example of FIG. 4, object i, upon being accessed by thread 1 holding lock $l_a$, is monitored until thread 1 releases lock $l_a$ (i.e., exits SFR 1, which is protected by $l_a$); during that monitored time period $T_1$, an access to object i by thread 2 is detected and, if conflicting, treated as a data race. Similarly, when thread 2 subsequently (following the end of period $T_1$) accesses object i from within a non-critical section, monitoring of object i begins anew, lasting throughout a time period $T_2$ that ends when thread 2 acquires a lock to enter a critical section; during $T_2$, a conflicting access of object i by thread 1 constitutes a data race. The conflict exception algorithm, beneficially, does not result in false positives because it detects actual conflicting memory accesses. On the downside, however, it is sensitive to thread scheduling (potentially resulting in false negatives if a potential conflicting access in the program does not materialize in a given execution instance) and does not scale because it monitors individual memory address bytes that each active SFR has accessed. Further, the conflict exception algorithm suffers from performance overhead even if it samples addresses to monitor or uses JVM, which can cause a two-fold slow-down. Custom hardware can reduce the overhead, but not resolve the scalability issues.

Turning now to FIG. 5, in accordance with various embodiments, data race detection relies on key-enforced access, facilitated by per-thread memory protection. In this approach, each protected shared variable v has, at any given time, a singular associated access key $k_v$ (selected from the memory protection keys supported by the processor) that is required to access v. (In some embodiments, to avoid initialization-related lockset issues (e.g., failure by a software developer to include lock acquisition/release function in the variable initialization routines), the algorithm starts to protect a shared variable with a key only after at least one thread holding a lock tries to access it.) A thread t can require $k_v$ if and only if no other thread is holding $k_v$, and any access to v without $k_v$ implies unordered memory access, and thus a potential data race. In various embodiments, a thread t will try to pre-acquire $k_v$ when it enters a critical section s that is supposed to access v, or to acquire $k_v$ when it actually accesses v (e.g., in cases where this access is the first access to a previously unprotected variable, or in a protection-interleaving context as described with respect to FIG. 10). Key acquisition by a thread means that the access permission for the key in the CPU register of the thread are set to read/write or read-only.

In an example embodiment, to achieve key-enforced access, the algorithm maintains various sets of access keys: for each thread t, a set K(t) of keys currently held by t; a set $K_F$ of "free" keys that no thread is currently holding; for each critical section s, a set K(s) of keys that a critical section s has been associated to access its shared variables; and, for each thread t currently executing a critical section s, a temporary set K*(t, s) of keys that the thread has acquired during entering or executing s. K*(t, s) serves to restore, upon exit of thread t from section s, the set K(t) of keys that the thread t held prior to entering section s, which is important, in particular, for key-enforced access in nested critical sections.

At the start of the program, $K_F$ is initialized with a set of all memory protection keys available for protecting shared variables, and K(t), K(s), and K*(t, s) are Ø for all threads t and critical sections s. The algorithm updates K(t) whenever a thread t acquires or releases a key, and it updates K(s) based on key assignments to shared variables during execution of critical sections. K(s) may also be updated from outside of section s in limited circumstances, e.g., when a key assigned to a variable accessed in s is recycled.

When a thread t enters a critical section s, it acquires a subset of K(s) that no other thread is currently holding: $K^*(t,s) \leftarrow K(s) \cap K_F$ and $K(t) \leftarrow K(t) \cup K^*(t,s)$. The acquired keys are removed from the set of free keys: $K_F \leftarrow K_F - K^*(t, s)$. During execution, if thread t attempts to access a variable v in section s for which it does not have the requisite key ($k_v \notin K(t)$), the algorithm checks whether $k_v$ is held by any other thread. If it is (i.e., $k_v \notin K_F$), the access is treated as a potential data race because $k_v$ being held by another thread t' implies that the access order with respect to v can be non-deterministic—v can be accessed any time by t' either before or after t accesses v. If $k_v$ is not held by any thread (which can happen in circumstances explained below), $k_v$ is added to K(t) and K*(t, s) and removed from $K_F$, just as would be done at the start of the critical section s. Lastly, when thread t exits from section s, it foregoes all keys acquired either at the start or during execution of s, K(t) ←K(t)–K*(t, s) and $K_F$←$K_F$–K*(t, s), and the set of keys for the critical section s is updated with any keys assigned to variables in section s in the course of execution by merging K*(t, s) with K(s), K(s)←K(s)∪K*(t,s).

If a thread t attempts to access a shared variable v from within a non-critical section while another thread holds $k_v$, the algorithm treats this as a data race. If no thread holds $k_v$ while t accesses v from within a non-critical section, the algorithm ceases to protect v with $k_v$ (i.e., it revokes $k_v$ and assigns a key reserved for non-critical sections, as explained further below). When v is subsequently accessed again from within a critical section, protection of v is resumed by assignment of a new key.

In the example of FIG. 5, thread 1 and thread 2 concurrently execute different critical sections that have a shared object i protected by key $k_i$ and are protected by two independent locks $l_a$ and $l_b$, respectively. Key-enforced access ensures that only thread 1, which enters the critical section protected by lock $l_a$ before thread 2 enters the section protected by lock $l_b$, gets the key $k_i$ (as $k_i$, upon acquisition by thread 1, is removed from the set of free keys $K_F$). Therefore, an attempt by thread 2 to access object i while thread 2 executes the critical section protected by $l_a$ (i.e., during time period $T_1$) constitutes a potential data race. Once thread 1 exits the section protected by lock $l_a$, it releases the key $k_i$. Since $k_i$ is again within the set of free keys $K_F$, object i is now accessible by thread 2, e.g., from within a non-critical section (as shown), or thread 2 can acquire $k_i$ to access object i from within a critical section.

Key-enforced access, like the lockset algorithm depicted in FIG. 3, enforces protection based on the locks acquired by threads. However, unlike the lockset algorithm, which considers as potential data races any case in which a shared variable is or was previously protected by a different lock, key-enforced access considers whether a shared variable is currently protected or not, resulting in fewer false positives. Like the conflict-exception algorithm, key-enforced access considers access to shared variables within critical sections, but it enforces protection at critical-section entry and exit points instead of at each memory access, thereby avoiding the large overhead from which conflict-exception algorithm suffers. Thus, key-enforced access serves to improve the trade-off between false positives and performance overhead.

FIGS. 6-10 explain in more detail various aspects and features of an example data race detection method in accordance with various embodiments.

Figure 6:
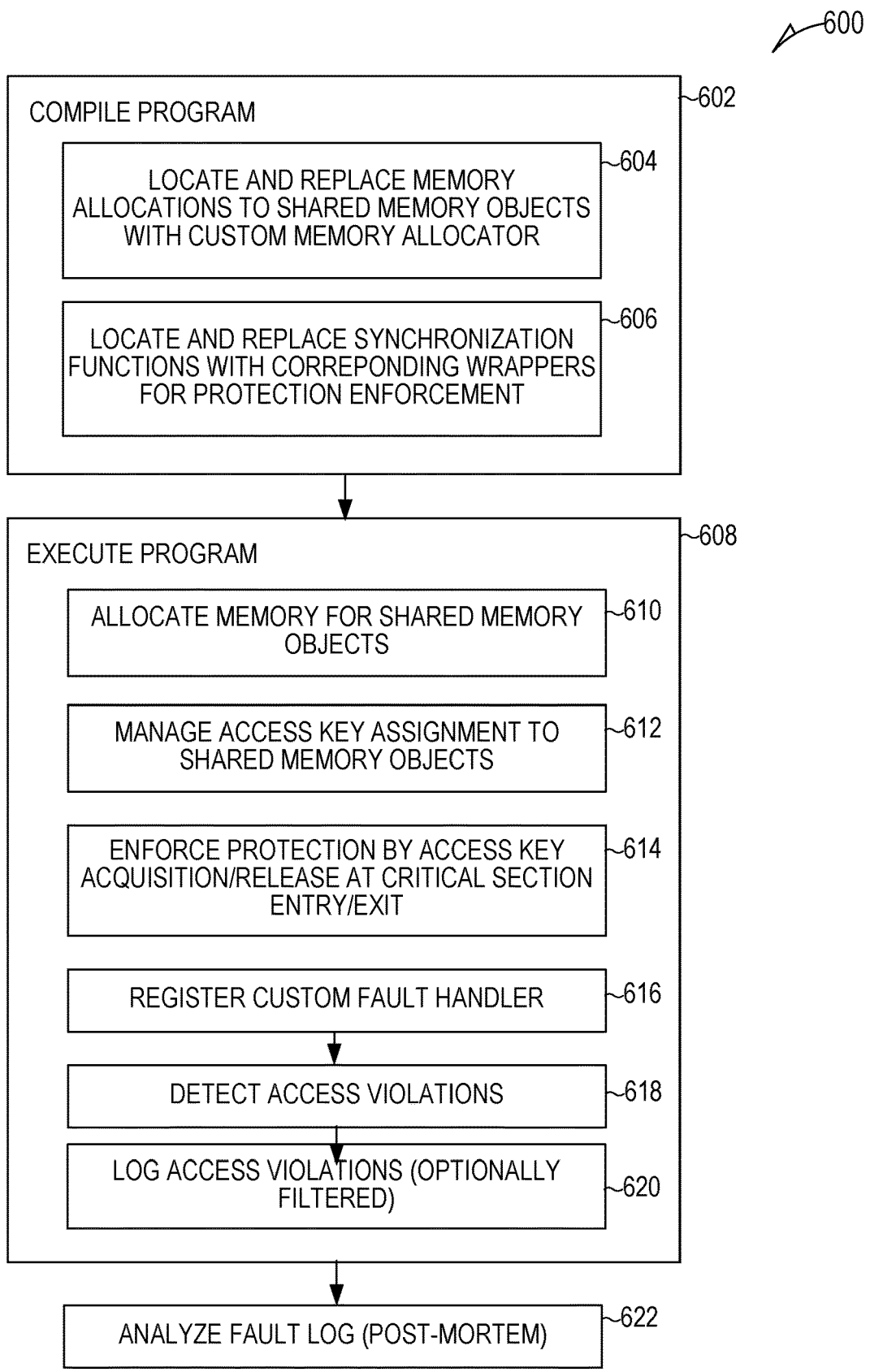
FIG. 6 is a flow chart illustrating a method for instrumenting, executing, and analyzing a program to detect data races, in accordance with various embodiments.

FIG. 6 provides, in the form of a flow chart, an overview of a method 600 that involves instrumenting, executing, and analyzing a program to detect data races. The method 600 can be performed, for instance, with a debugging tool 108 as shown in FIG. 1, taking advantage of per-thread memory protection functionality as explained with respect to FIG. 2. The method 600 begins, during compilation of a program (operations 602), with the analysis of the program source code and identification and instrumentation of all memory allocations to sharable objects (e.g., heap and global variables) and synchronization calls. Specifically, one compiler pass (operation 604) locates all global and heap memory allocations in the program (such as, e.g., in C/C++ source code: malloc( ), free( ), new, delete, realloc( ), posix-memalign( ), and/or strdup( )) and replaces them with a custom memory allocation routine (e.g., memory allocator 118) that assigns each shared (or sharable) memory object to a unique memory page and optionally consolidates virtual memory pages by page aliasing (as explained below with reference to FIG. 7). This pass also inserts runtime function calls at the start of the program to provide the runtime with information regarding the global memory objects allocated by the program. Another compiler pass (operation 606) locates synchronization functions (i.e., locking/unlocking functions such as, e.g., lock( ), wrlock( ), rdlock( ), trylock( ), timedlock( ), and/or unlock( )) and replaces them with corresponding wrapper functions (e.g., synchronization wrapper functions 120) that follow the semantics of the original functions, first calling the intended functions and, based on the return values (e.g., whether a lock was successfully acquired), deciding whether to provide additional functionality (e.g., for access key acquisition by a thread). (The function cond_wait( ), which requires temporary releases of a lock until a signal is acquired, is supported, in some embodiments, by inserting unlock( ) and lock( ) code before and after the function.)

The method 600 further involves, during execution (operations 608) of the thus instrumented program, dynamically allocating memory for the shared objects by the custom memory allocator (operation 610), managing the assignment of access keys to shared memory objects by writing the keys to the page table (e.g., using the system call pkey_mprotect( )) (operation 612), and enforcing protections whenever a thread enters and exits a critical section by updating the access permissions for the keys in the thread-local registers (operation 614). Memory allocation (in 610) involves assigning each shared memory object to a respective virtual memory page (that does not store any other of the shared memory objects), and results, upon assignment of an access key to that virtual memory page (at 612) in the protection of the shared memory object with the assigned key.

At runtime (operations 608), moreover, a custom fault handler (e.g., fault handler 126) is registered (operation 616) and used to detect access violations (e.g., an attempted access by a thread to a shared memory object whose associated key the thread does not hold) (operation 618) and record them in a log (operation 620). In some embodiments, the fault handler is configured to filter the detected access violations and omit non-racy violations and/or probe for the correctness of racy violations using a scheme herein referred to as protection interleaving (explained below with respect to FIG. 10.) The access key assignments (which involve migrating memory objects between various protection domains), access key acquisitions by the threads, and detection of access violations are closely interrelated, as illustrated below with reference to FIGS. 8A-8B and 9.

Finally, the method 600 involves an automated post-mortem (i.e., following program execution) analysis of the logged access violations stored in the fault log, which serves to prune away redundant and non-racy warnings raised during execution (operation 622). The resulting pruned fault log can be used by the program developer to debug the program.

Figure 7:
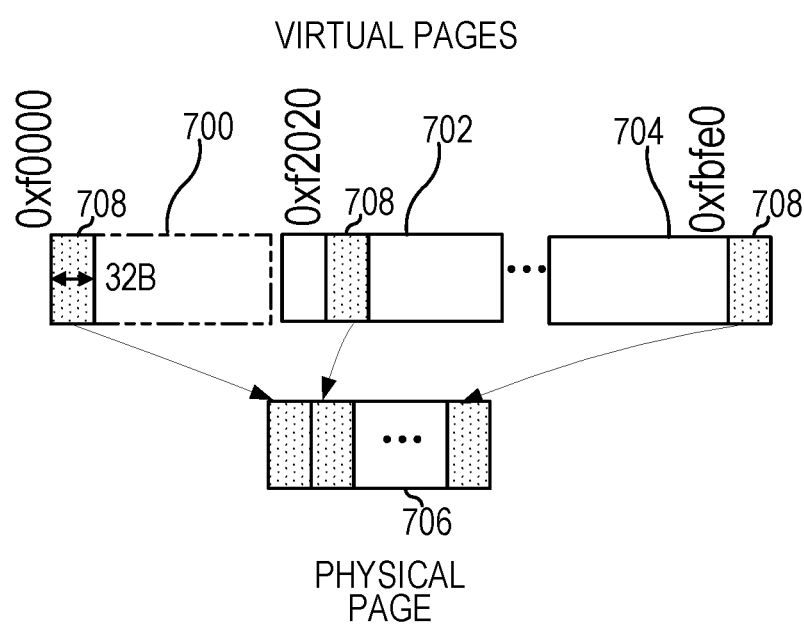
FIG. 7 is a schematic diagram illustrating virtual page consolidation in accordance with various embodiments.

With reference to FIG. 7, virtual page consolidation in accordance with various embodiments is illustrated. As noted above, memory protection hardware enables memory access control at page level (a page being 4 KB in many cases). Conventional heap allocators, however, are usually optimized for memory consumption, and store multiple memory objects in the same page, which, when combined with page-level protection, could result in extraneous access violations, hampering the accuracy and performance of data race detection. To allow individual memory objects to have different protection scope, therefore, the custom memory allocator used to facilitate key-enforced access as described herein assigns a unique virtual page to each shared memory object. Naïve unique virtual page allocation can waste a huge amount of physical memory, especially when the program allocates many small chunks of memory. In various embodiments, such inefficient memory use is avoided, as conceptually depicted in FIG. 7, by consolidating different virtual pages 700, 702, 704 into a single physical page 706 (e.g., of the same size). For example, if individual memory objects 708 each take up no more than 32 B of memory, 128 such objects 708 can be fit into one physical page 706. To avoid overlap between the different memory objects 708 within the physical page 706, the base addresses at which the objects 708 are stored within the virtual pages 700, 702, 704 (etc.) are shifted between virtual pages by multiples of 32 B (e.g., by 32 B increments between adjacent virtual pages). In other words, the base address alignment of the objects 708 is of 32 B at different offsets. This approach is called page aliasing.

To manage protection-key assignments to memory objects and track any access violations back to the affected memory objects, the debugging tool maintains, for each shared object, its base address (corresponding to its virtual page number and offset), allocation size, and currently assigned protection key. From a given base address, the page-aligned address (corresponding to the page number of the respective virtual page) can be calculated to configure or remove memory protection (in the page table) or deallocate/reallocate memory. Further, whenever the system raises a fault (e.g., in x86 instruction set architectures, a general protection fault (GPF)), the exact memory object can be located by determining which virtual base address and associated size (among the allocated objects) overlaps with the faulting address.

In various embodiments, each memory object belongs conceptually to one of three domains—critical, non-critical, and non-monitored—at any point during its lifetime. The protection domains are configured and enforced with different protection keys, ensuring different access semantics. In particular, the algorithm described with reference to FIG. 5 above is specific to the access semantics of the critical domain. Access semantics for the non-critical domain differ, for example, in that the corresponding protection key may be held by multiple threads. Regardless of the domain to which a memory object belongs, however, accessing that object without the assigned memory key results in a protection fault. Memory objects can migrate between domains according to certain rules. In the following, the domains and migration therebetween in accordance with particular embodiments are described.

Newly allocated heap and global memory objects belong to the non-critical domain, which, in some embodiments, is assigned a reserved protection key $k_{nc}$ (e.g., $pkey_{15}$ in an implementation that supports up to sixteen memory protection keys) by the memory allocator. The key-enforced access algorithm ensures that threads executing non-critical sections (i.e., program sections not protected by locks) hold $k_{nc}$ whereas threads within critical section (i.e., within a lock-protected section) do not hold $k_{nc}$. In particular, $k_{nc}$ is given to any threads that are newly spawned or successfully exit from (all nested) critical sections (allowing for multiple threads to simultaneously hold $k_{nc}$) and retracted from threads that successfully enter critical sections. As a result of the retraction of $k_{nc}$, when a thread executing a critical section accesses an object in the non-critical domain, a fault will be raised. In this manner, the algorithm can accurately pinpoint which memory objects are critical (i.e., identify the memory addresses of objects accessed by critical sections) and register them to the critical section (e.g., in a section-object map 124, as further illustrated in FIG. 9) and move them to the critical domain.

Memory objects accessed within critical sections belong to the critical domain, which is protected, in some embodiments, by fourteen memory protection keys ($pkey_1$ through $pkey_{14}$), corresponding to fourteen sub-domains of the critical domain. To prevent concurrent access to such protected memory objects, the algorithm ensures that each of these protection keys can only be held by one thread (executing a critical section) at a time. Further, threads executing non-critical sections cannot obtain any of the protection keys assigned to the critical domain, and their access to memory objects in the critical domain therefore results in a protection fault. However, as explained further with reference to FIGS. 8A-8B and 9, a memory object in the critical domain can move back to the non-critical domain when its protection key is not held by any thread under certain conditions, such as when a non-critical section accesses the object (e.g., during object re-initialization or deletion) or when the protection key assigned to the object needs to be recycled.

All memory objects that are not monitored are assigned the default protection key $k_{def}$ (e.g., $pkey_0$ when current Intel MPK is used). Such non-monitored objects include, e.g., thread-local memory objects (e.g., stack variables), mutex variables that should be accessible to synchronization functions, and whitelisted memory objects (such as objects annotated by developers as resulting merely in benign races). Objects in the critical domain may be moved to the non-critical domain, in accordance with some embodiments, when they are subject to redundant protection faults; since one or more protection faults concerning the objects are already reported, such domain migration causes no harm, but can improve runtime performance.

Figure 8A:
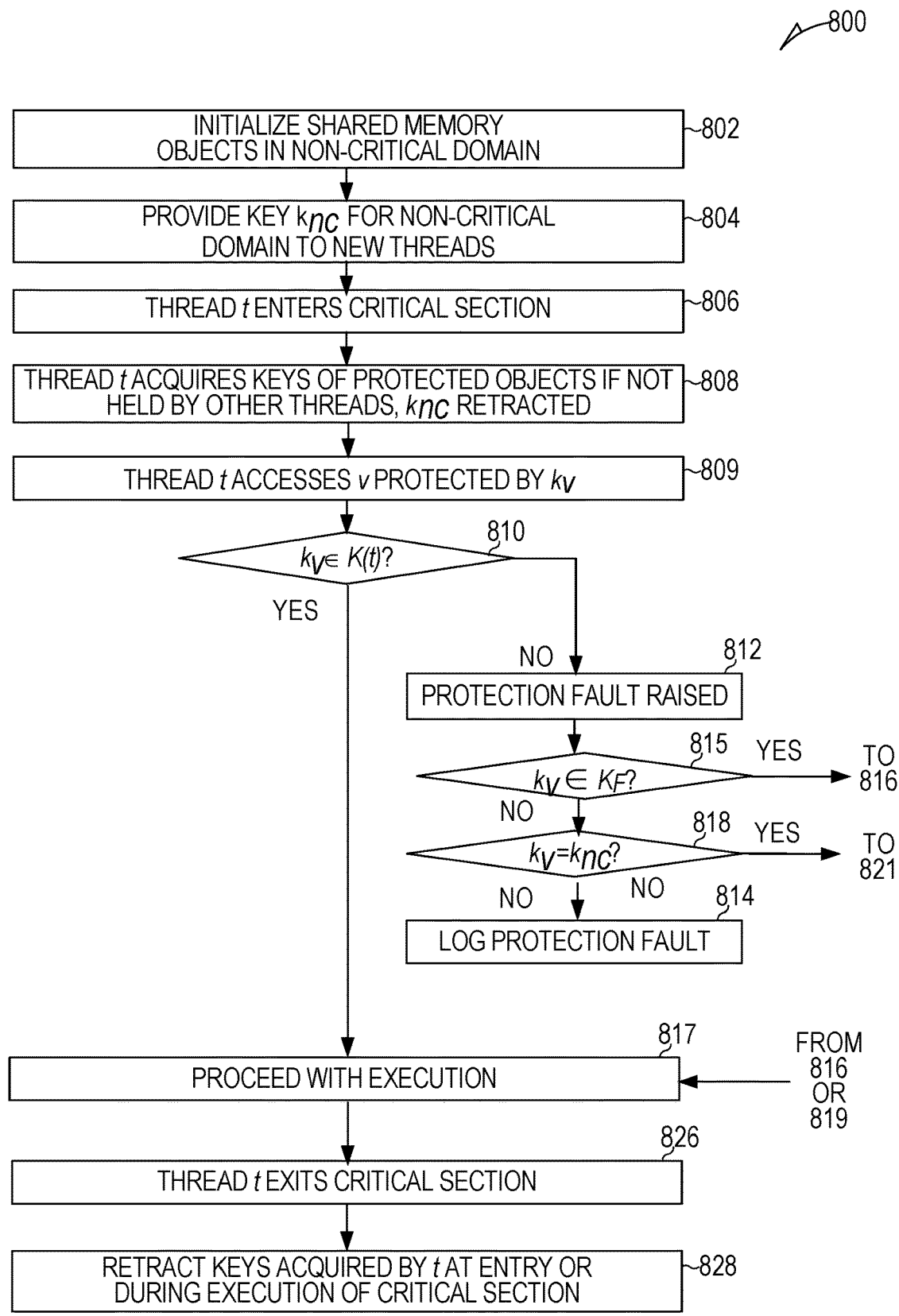
FIGS. 8A and 8B depict a flow chart illustrating how memory objects migrate between protection domains during key-enforced access for data race detection in accordance with various embodiments.
Figure 8B:
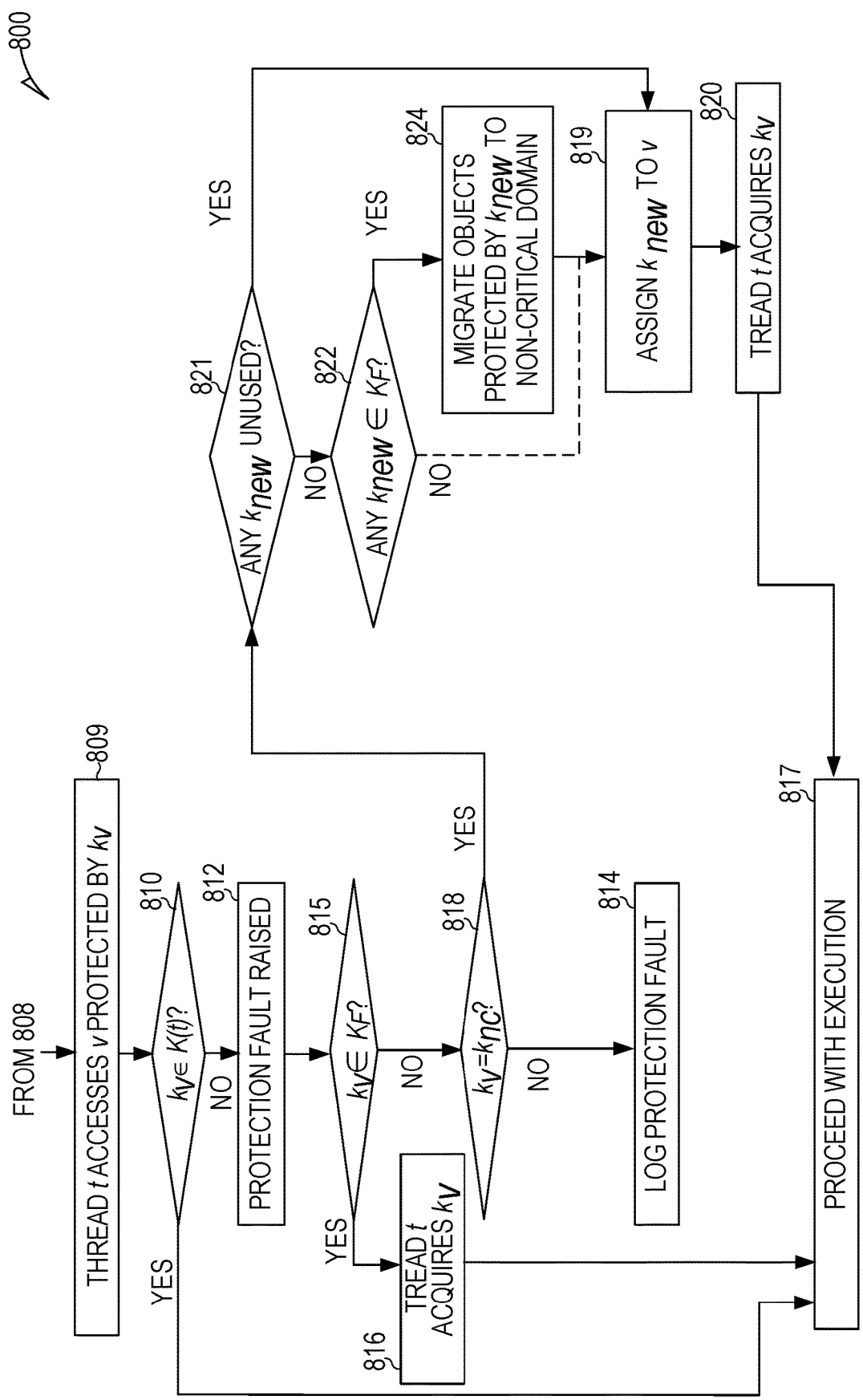
Figure 9:
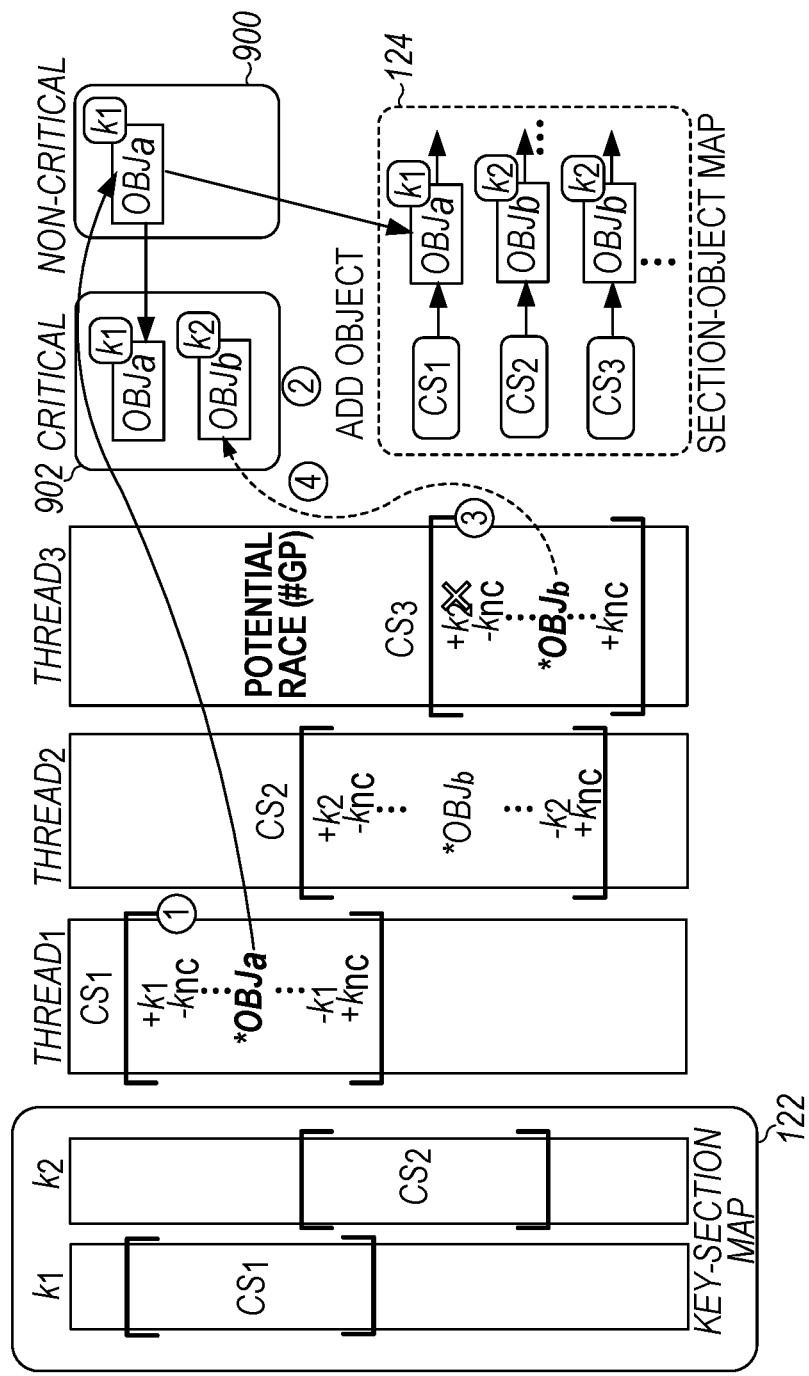
FIG. 9 is a schematic diagram illustrating critical memory object identification and protection in accordance with various embodiments.

FIGS. 8A and 8B depict, in the form of a flow chart, a method 800 for implementing key-enforced access for data race detection, including migration of memory objects between protection domains, in accordance with various embodiments. FIG. 9 further illustrates various operations and aspects of the method 800 with an example of three threads accessing memory objects in various critical sections.

Each shared memory object is initialized, during memory allocation, as part of the non-critical domain by assigning $k_{nc}$ to the object (operation 802). Objects migrate to the critical domain on demand, upon being accessed by a thread within the critical domain. Objects within the critical domain (herein also, for brevity, "critical objects" or "critical memory objects") are tracked in a section-object map 124 (shown in FIGS. 1 and 9), which maintains, for each section, a list of the protected objects used within the section (not including any objects currently within the non-critical domain). From the section-object map 124, in conjunction with the protection key assignments listed in the page table (or duplicated directly in the section-object map 124), the set K(s) of keys (belonging to the critical domain) assigned to memory objects occurring within a critical sections s can be readily determined for all critical sections.

When a thread t is newly spawned, it initially receives only the $k_{nc}$ for the non-critical domain (operation 804); that is, the set K(t) of keys of the critical domain that are held by thread t is initially empty. (Note that K(t) is defined to include only keys that are exclusive, i.e., can be held by only one thread at a time, which is not the case for the key $k_{nc}$ assigned to the non-critical domain.) Upon entering a critical section s (operation 806), the thread t first looks up the section s in the section-object map 124 to determine all keys (if any) that are assigned to critical objects accessed within the section s, and then checks whether those keys are active (i.e., currently held by other threads); the thread t acquires only the (sub-)set of the keys protecting critical objects within s that are not currently held by another thread (operation 808). Further, if the thread t enters the section s coming from a non-critical section, the key $k_{nc}$ is retracted (also in operation 808). The keys in the critical domain that are held by the various threads (i.e., the sets K(t)), and, conversely, the keys in the critical domain that are not held by any thread (i.e., the set $K_F$) are discernable from the thread-local registers 224, 226, and may also be explicitly tracked in a key-section map 122 (shown in FIGS. 1 and 9). As shown in FIG. 9, the key-section map 122 records, as a function of time (going downward in the figure), which keys are in use by which critical sections. Since a critical section can only be executed by one thread at a time, this association between keys and critical sections implicitly also associates no more than one thread with any given key.

Having entered the critical section s, if the thread t accesses (or attempts to access) a shared memory object v (operation 809) protected by a key $k_v$ that it does not hold (as determined at 810), this memory-protection-key-driven access violation raises a protection fault, which causes the kernel to send a signal (e.g., SIGSEGV) to the fault handler 126 (operation 812). The signal may include the faulting address (which can be backtracked to the shared object subject to the access violation), the violated protection key, whether the attempted access was read or write access, and other process context (e.g., instruction pointers, identifiers of both threads and/or both sections that accessed or attempted to access the object and an indication which thread held the key). Depending on the cause of the fault, the fault handler 126 may act on the signal in various ways, e.g., logging the fault (operation 814) or omitting it, and, in some cases, migrating objects via protection key assignments.

FIG. 9 illustrates a protection fault due to a potential data race, which is the case that the key-enforced access algorithm is designed to detect. Here, threads 2 and 3 both attempt to access shared critical object $obj_b$ via respective critical sections $CS_2$ and $CS_3$. Thread 2 acquires the requisite key $k_2$ that protects $obj_b$ upon entry into section $CS_2$. However, thread 3, which enters section $CS_3$ while tread 2 is still executing $CS_2$, cannot obtain the key $k_2$, and therefore raises a fault upon trying to access $obj_b$. Since thread 2 still holds key $k_2$ at the time of attempted access by thread 3, this situation constitutes a simultaneous, potentially conflicting access. Accordingly, the protection fault is logged (at 814) in this case.

Returning to the description of FIGS. 8A and 8B, if the thread t was not able to acquire $k_v$ upon entering the critical section because some other thread held the key at the time, but later, when thread t accesses v, the key $k_v$ is no longer held by any other thread (as determined at 815), implying that the thread that previously held it has since released it, thread t can now acquire $k_v$ (operation 816) and proceed with the execution of the section (operation 817).

It is noted that the mutual exclusion of threads from simultaneously holding the same protection key may be limited to write access. That is, in some embodiments, when a thread enters a critical section with write lock (wrlock( )), all other threads are precluded from acquiring the protection keys held by that thread. By contrast, if a thread enters a critical section with read lock (rdlock( )), it receives read-only permission for the protection keys it acquires, and other threads can, in this case, acquire the same protection keys with read-only permission if they likewise enter respective critical sections with read lock.

Still with reference to FIGS. 8A and 8B, a special case in which a protection fault can arise is an attempted access to an object v that is still within the non-critical domain (i.e., $k_v = k_{nc}$) (as determined at 818), either because the object has not previously been accessed from within a critical domain at all, or because a previously assigned protection key from the critical domain has been retracted (e.g., due to a subsequent access from within the non-critical domain or for the purpose of key recycling). In this case, the detected fault may be omitted from the fault log 116, and the object v is moved to the critical domain by assignment of a protection key $k_{new}$ that belongs to the critical domain (operation 819). The newly assigned key $k_{new}$ is provided to the thread t (i.e., added to K(t)) (operation 820) to enable access to the now protected critical object v, and the thread t proceeds with execution of the critical section (operation 817).

In various embodiments, when assigning a new key, the algorithm first tries to find an unused protection key (i.e., a key not assigned to any object within another critical section) (operation 821) and, if successful, assigns that key (at 819). In particular, if thread t already holds a key (assigned to another object within the critical section s) that is not also associated with another critical section, it preferably uses the key it already holds to protect v. In this manner, critical objects are grouped, to the extent possible, by critical section, which can help minimize both the number of keys needed (avoiding the need to recycle or even share keys between threads) and the frequency with which key assignments and access rights are to be updated; in other words, linking protection keys to critical sections can improve performance.

If no key can be found (at 821) that is not also assigned to one or more objects in other critical sections, the algorithm next looks for a key that is free, i.e., not currently held by any other thread ($k_v \in K_F$) (operation 822). Before assigning this key to the object v, the algorithm migrates all shared objects currently protected by that key to the non-critical domain (operation 824). This migration serves to avoid false negatives in race bug detection: if the key $k_{new}$ newly assigned to object v were to be retained by other critical objects, thread t would now be able to access these objects without raising a fault. The next time one of the previously protected objects is accessed from within a critical section, a new protection key is assigned in the same manner just described (e.g., involving some or all of operations 819-824). Recycling of keys (by migrating objects that they protect to the non-critical domain and reusing them) may be used to accommodate a number of critical sections in the program in excess of the number of available memory protection keys (e.g., fourteen keys). In some usage scenarios, recycling of keys may be precluded because all available protection keys are held by other running threads. In such instances, the algorithm may allow protection keys to be shared, which, however, can result in false negatives.

FIG. 9 illustrates migration of an object $obj_a$ from the non-critical domain 900 to the critical domain 902. As shown, thread 1 attempts to access $obj_a$ from within critical section $CS_1$, but does not hold the key $k_{nc}$ that is initially assigned to $obj_a$ (the key $k_{nc}$ having been retracted from thread 1 upon entry into $CS_1$). The access attempt thus triggers a protection fault, which is followed by the assignment of a key $k_1$ from the critical domain to object $obj_a$. This key assignment moves the object $obj_a$ into the critical domain 902, and causes it to be entered into the section-object map 124.

In some instances, a program will access protected objects without acquiring specific permissions, e.g., during re-initialization and deletion from within the non-critical domain. Although such an access will raise a protection fault, there is no actual access violation if no thread holds the protection key belonging to the faulting object (i.e., reinitialization or deletion are proper if all critical sections that access the protected object have been exited). Accordingly, by checking (e.g., in the key-section map) whether the protection key is held by another thread or not, such cases can be identified and omitted from the fault log.

Further, in some cases, protection faults raised within a critical section (in operation 812) constitute false alarms. Since protection is enforced at the start of a critical section, and since the keys that a thread acquires when entering the critical section are based on a liberal estimate of the keys that may be needed during execution of the section, a thread may obtain protection keys assigned to objects that it need not access in a particular execution of the program. In this case, another thread that does access the object may be denied the associated key, resulting in an unnecessary protection fault. Another case is when the threads executing different respective critical sections are concurrently accessing the same memory object, but at different byte offsets within the memory object. Since only one thread holds the protection key, the other thread's memory access onto that object will raise a false alarm, even though the memory access does not pose a conflict given that different bytes are accessed.

Figure 10:
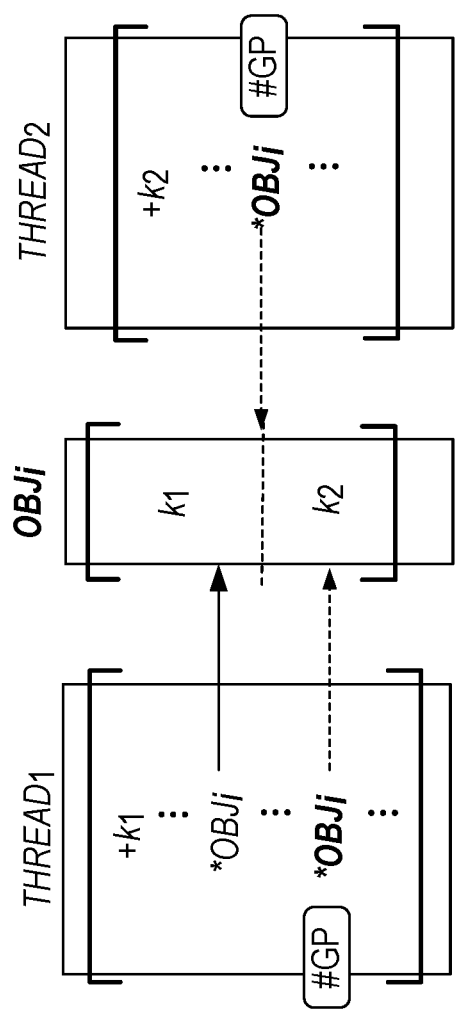
FIG. 10 is a schematic diagram illustrating a protection interleaving scheme for false-positives reduction in accordance with various embodiments.

In various embodiments, the accuracy of an alarm can be probed using a protection interleaving scheme for violated protected objects, as is illustrated in FIG. 10. Herein, thread 1 holds the protection key $k_1$ for memory object i, and thread 2, when attempting to access object i, therefore raises a protection fault. In this case, the algorithm can forcefully assign one of the protection keys held by thread 2 (or some newly acquired protection key) to object i to allow thread 2 to proceed with its execution. Later, if thread 1 or any other thread (other than thread 2) accesses object i, another protection fault will be triggered. In this manner, the algorithm can observe multiple protection faults from the same memory object in different critical sections to probe whether these threads are concurrently accessing the memory object at the same offset or not.

With renewed reference to FIGS. 8A and 8B, when thread t exits the critical section s (operation 826), all keys given to it upon entry (at operation 808) or during execution of the critical section (e.g., at operation 819) are retracted (operation 828). More specifically, if the thread t exits its outermost critical section (i.e., enters a non-critical section), all of its protection keys belonging to the critical domain are revoked, and access to the non-critical domain is granted via $k_{nc}$. On the other hand, if the thread t exits from a nested section (i.e., is still within a parent critical section), only the keys that the thread acquired upon entering (or during execution of) the critical section are revoked. Thus, the set of keys K(t) that the thread t held upon section entry is restored. For purposes of such restoration, key sets K(t) may be backed up (e.g., in thread-local storage) upon section entry, and/or any keys added to K(t) may be tracked in a temporary set $K^*(t, s)$ as described with respect to FIG. 5.

In some embodiments, key retractions from a thread are time-stamped to allow filtering out certain warnings without ignoring actual access violations. For example, the delay between the time when a protection fault is raised and the time when the fault handler processes it may affect whether a protection key has been released by a thread at the time the fault is evaluated. In some instances, this delay is on the order of 24,000 clock cycles. Timestamps associated with the release of protection keys may be used to account for the delay in the computations. For example, if thread 1 released its key associated with a shared variable only after thread 2 accessed the variable (raising a protection fault), but before the fault handler checks this protection fault, the fault handler, without knowledge of timestamps, might dismiss the protection fault as a fault alarm, but, with knowledge of the timestamp, will retain the protection fault.

Alternatively to or in addition to filtering protection faults when they are raised, the logged faults may be further processed, in accordance with various embodiments, to filter out redundant or non-racy access violations. For example, by using the recorded signal information (e.g., faulting address, e.g., faulting address, read or write violation, thread identifier, and instruction pointer) and metadata such as, e.g., the key-section map and section-object map, some faults can be pruned by post-mortem analysis. First, redundant violations of the same object from different threads may be removed. Second, when protection-interleaving is used, the accuracy of the reported faults can be determined by checking whether the observed interleaved violations for a given object belong to the same offsets or different offsets within the object. If none of the reported faults for a given memory object access the same offset, the violations are considered potentially non-racy. Third, in cases where a protection key is shared between different simultaneously executing critical sections, false positives may be pruned from the log by checking whether the key-holding critical section can access the violated object or not and, if not, ignoring the fault as a false positive. Further methods for pruning the fault log may occur to those of ordinary skill in the art.

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

FIG. 11 is a block diagram of an example computing system as may be used to implement the systems of FIGS. 1 and 2, in accordance with various embodiments. In alternative embodiments, the computing system may be a machine operating as a standalone device or, alternatively, connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 can further include a video display 1110 (e.g., a liquid crystal display (LCD) or a cathode ray tube (CRT)). The computer system 1100 also includes an alpha-numeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

The disk drive unit 1116 includes a machine-readable medium 1122 on which are stored one or more sets of data structures and instructions 1124 (e.g., software) embodying or utilized by any one or more of the methodologies or functions described herein. The instructions 1124 can also reside, completely or at least partially, within the main memory 1104 and/or within the processor 1102 during execution thereof by the computer system 1100, with the main memory 1104 and the processor 1102 also constituting machine-readable media.

While the machine-readable medium 1122 is shown in an example embodiment to be a single medium, the term "machine-readable medium" can include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1124 can be transmitted or received over a communication network 1126 using a transmission medium. The instructions 1124 can be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

The following numbered examples are illustrative embodiments.

1. A non-transitory machine-readable medium storing instructions for execution by a computer processor, the instructions causing the processor to perform operations for detecting data races in a multi-threaded program comprising one or more critical sections and a plurality of shared memory objects, the operations comprising: protecting each of the plurality of shared memory objects by a respective access key selected from a set of keys associated with a critical domain; upon entry of any of multiple threads of the program into any of the one or more critical sections, providing to the thread, for each of the plurality of shared memory objects that is accessed within the section, the respective access key if the access key is not held by any other of the multiple threads; and upon any attempt, by any of the multiple threads, to access any of the shared memory objects without holding the respective access key, detecting a protection fault.

2. The machine-readable medium of example 1, wherein protecting each of the plurality of shared memory objects by a respective access key comprises assigning the plurality of shared memory objects to respective virtual memory pages each storing only one of the plurality of shared memory objects, and assigning the access keys to the respective virtual memory pages storing the respective memory objects.

3. The machine-readable medium of example 2, wherein the set of keys associated with the critical domain comprises a plurality of memory protection keys supported by the processor.

4. The machine-readable medium of example 3, wherein the access keys are assigned to the respective virtual memory pages by the program via a system call.

5. The machine-readable medium of any of examples 2-4, the operations further comprising consolidating multiple of the virtual memory pages in a single physical memory page, wherein the respective memory objects are stored within the multiple virtual memory pages at multiple respective offsets.

6. The machine-readable medium of any of examples 1-5, the operations further comprising, during compilation of the program, instrumenting the shared memory objects with a memory allocator configured to assign the plurality of shared memory objects to the respective virtual memory pages, and instrumenting synchronization functions defining the one or more critical sections with wrapper functions configured to provide access keys to threads upon entry into the one or more critical sections.

7. The machine-readable medium of any of examples 1-6, wherein providing an access key to one of the multiple threads comprises setting access rights to the access key in a thread-local processor register associated with the thread.

8. The machine-readable medium of any of examples 1-7, wherein each of the plurality of shared memory objects is protected by the respective access key upon first access by one of the multiple threads from within one of the one or more critical sections.

9. The machine-readable medium of example 8, wherein each of the plurality of shared memory objects is initialized as part of a non-critical domain by assignment of a key associated with the non-critical domain, and migrates to the critical domain by assignment of the respective access key in response to a protection fault caused by an attempt, by any of the multiple threads, to execute the respective shared memory object without holding the key associated with the critical domain.

10. The machine-readable medium of example 8 or example 9, wherein, for each of the plurality of shared memory objects, protecting the shared memory object by a respective key upon first access within one of the one or more critical sections comprises selecting, from the set of keys associated with the critical domain, an access key not assigned to any of the shared memory objects accessed within any other of the one or more critical sections.

11. The machine-readable medium of any of examples 8-10, wherein, for each of the plurality of shared memory objects, protecting the shared memory object by a respective key upon first access by one of the multiple threads within one of the one or more critical sections comprises selecting, from the set of keys associated with the critical domain, an access key not held by any other of the multiple threads.

12. The machine-readable medium of any of examples 1-11, the operations further comprising, upon exit of any of the multiple threads from any of the one or more critical sections, retracting any one or more access keys provided to the thread upon entry or during execution of the critical section.

13. The machine-readable medium of any of examples 1-12, the operations further comprising automatically analyzing detected protection faults to eliminate redundant faults or false alarms.

14. A system for detecting data races in a multi-threaded program comprising one or more critical sections and a plurality of shared memory objects, the system comprising: a computer processor supporting per-thread memory protection; and computer memory storing a plurality of software components each comprising instructions for execution by the computer processor, the software components comprising: a memory allocator configured to assign the plurality of shared memory objects to respective virtual memory pages each storing only one of the plurality of shared memory objects, each shared memory object being protectable by a memory protection key assigned to the respective virtual memory page; synchronization wrapper functions associated with the one or more critical sections to provide to a thread, upon entry of the thread into one of the one or more critical sections, for each of the plurality of shared memory objects that is accessed within the critical section, the respective memory protection key, provided that no other thread holds the memory protection key, wherein an attempt by the thread to access any of the shared memory objects without holding the respective memory protection key causes a protection fault; and a fault handler to receive and process any protection fault raised by access to one or the memory objects without the respective memory protection key.

15. The system of example 14, wherein the fault handler is configured store at least some of the protection faults to a fault log.

16. The system of example 14 or example 15, wherein the software components further comprise a post-mortem analyzer to prune the protection faults stored in the fault log to remove at least one of redundant faults and false alarms.

17. The system of any of examples 14-16, wherein the software components further comprise a backend code analysis and instrumentation component to locate, in source code of the program, memory allocations to shared memory objects and synchronization functions associated with the one or more critical sections, and to replace the memory allocations with the memory allocator and the synchronization functions with the synchronization wrapper functions.

18. A method for data race detection during execution of a multi-threaded program, the method comprising: maintaining a first set of access keys available for acquisition; maintaining multiple second sets of access keys held by respective ones of multiple threads, the first set of access keys and the multiple second sets of access keys collectively containing an entirety of keys, wherein an access key is removed from the first set of keys upon acquisition by any of the multiple threads and added back to the first set of keys upon release by that thread; maintaining one or more third sets of access keys for one or more respective critical sections of the program, each access key within one of the one or more third sets of access keys being one of the keys of the entirety of keys and being associated with a memory object to be accessed within the respective critical section; and registering a data race upon an attempt of any of the multiple threads to access a memory object whose associated access key is held by another one of the multiple threads.

19. The method of example 18, wherein maintaining the multiple second sets of access keys comprises, at a time of entry of one of the multiple threads into one of the one or more critical sections, acquiring, by the thread, any key of the third set of access keys associated with the critical section that is within the first set of access keys at the time of entry.

20. The method of example 18 or example 19, wherein maintaining the one or more third sets of access keys comprises, for each of the one or more critical sections, upon a first attempt by one of the multiple threads to access a memory object within the critical section, assigning one of the keys of the entirety of keys to the memory object.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method for data race detection during execution of a multi-threaded program comprising one or more critical sections, the method using a set of access keys available to protect memory objects in the one or more critical sections, wherein each memory object is protected by only one of the access keys at a time, the method comprising:
    maintaining, in one or more machine-readable media, a first subset of the set of access keys, the first subset consisting of access keys currently not held by any of multiple threads and thus available for acquisition;
    maintaining, in the one or more machine-readable media, multiple second subsets of the set of access keys, each of the second subsets associated with one of the multiple threads and consisting of access keys held by that thread, the first subset and the multiple second subsets collectively containing all keys of the set of access keys available to protect the memory objects in the one or more critical sections of the program, wherein an access key is removed from the first subset upon acquisition from the first subset by any of the multiple threads and added back to the first subset upon release by that thread;

maintaining, in the one or more machine-readable media, one or more third subsets of the set of access keys, each of the one or more third subsets associated with one of the one or more critical sections of the program, each access key within one of the one or more third subsets of access keys being one of the keys of the set of access keys and being associated with a memory object to be accessed within the respective critical section, at least one of the third subsets comprising at least two access keys; and detecting, by a computer processor, an attempt of one of the multiple threads to access a memory object whose associated access key is held by another one of the multiple threads, and registering a data race in response thereto.

2. The method of claim 1, wherein maintaining the multiple second subsets comprises, at a time of entry of one of the multiple threads into one of the one or more critical sections, acquiring, by the thread, any one or more keys of the third subset associated with the critical section that are within the first subset at the time of entry.

3. The method of claim 1, wherein maintaining the one or more third subsets comprises, for each of the one or more critical sections, upon an attempt by one of the multiple threads to access a memory object within the critical section that is not protected by any key of the set of access keys, assigning one of the keys of the set of access keys to the memory object.

4. The method of claim 3, wherein maintaining the one or more second subsets comprises, upon assigning one of the keys to the memory object, adding the assigned key to the second subset associated with the respective thread.

5. The method of claim 3, wherein maintaining the one or more third subsets further comprises, upon exit of the respective thread from the critical section, adding the assigned key to the third subset associated with the critical section.

6. The method of claim 3, wherein assigning one of the keys of the set of access keys comprises assigning an access key from the second subset associated with the respective thread that is not also within a third subset associated with another one of the one or more critical sections.

7. The method of claim 3, wherein assigning one of the keys of the set of access keys comprises assigning an access key from the first subset of access keys, and wherein maintaining the one or more third subsets further comprises retracting the assigned access key from a third subset associated with another one of the one or more critical sections.

8. The method of claim 1, wherein maintaining the multiple second subsets comprises, upon an attempt by one of the multiple threads to access, within one of the one or more critical sections, a memory object whose associated access key is within the first subset, acquiring the access key by the thread.

9. The method of claim 1, further comprising:
maintaining one or more temporary fourth subsets of the set of access keys, each of the temporary fourth subsets being associated with one of the multiple threads and with a section among the one or more critical sections that is being executed by the thread, each of the temporary fourth subsets of access keys including all access keys acquired by the respective thread during entering or executing the respective critical section, and wherein maintaining the one or more second subsets comprises, upon exit of one of the multiple threads from one of the one or more critical sections, retracting all access keys within the associated temporary fourth subset from the second subset associated with the thread.

10. The method of claim 9, wherein maintaining the one or more third subsets comprises, upon exit of one of the multiple threads from one of the one or more critical sections, merging the associated temporary fourth subset with the third subset associated with the respective critical section.

11. The method of claim 1, wherein maintaining the multiple second subsets comprises, upon acquisition of an access key by or retraction of the access key from one of the multiple threads, updating, within a thread-local processor register associated with the respective thread, an access permission for the associated key.

12. The method of claim 1, wherein maintaining the multiple third subsets comprises tracking protected memory objects in the one or more critical sections in a section-object map and tracking access keys associated with the protected memory objects in a page table that maps virtual memory pages storing memory objects to physical memory addresses.

13. A system comprising:
a computer processor supporting per-thread memory protection using a set of access keys available to protect memory objects in one or more critical sections of a multi-threaded program, wherein each memory object is protected by only one of the access keys at a time; and computer memory storing processor-executable instructions for data race detection during execution of the multi-threaded program on the computer processor, the instructions, when executed by the computer processor, causing the computer processor to perform operations comprising:

maintaining, in the computer memory, a first subset of the set of access keys, the first subset consisting of access keys currently not held by any of multiple threads and thus available for acquisition;

maintaining, in the computer memory, multiple second subsets of the set of access keys, each of the second subsets associated with one of the multiple threads and consisting of access keys held by that thread, the first subset and the multiple second subsets collectively containing all keys of the set of access keys available to protect the memory objects in the one or more critical sections of the program, wherein an access key is removed from the first subset upon acquisition from the first subset by any of the multiple threads and added back to the first subset upon release by that thread;

maintaining, in the computer memory, one or more third subsets of the set of access keys, each of the one or more third subsets associated with one of the one or more critical sections of the program, each access key within one of the one or more third subsets being one of the keys of the set of access keys and being associated with a memory object to be accessed within the respective critical section, at least one of the third subsets comprising at least two access keys; and detecting, by the computer processor an attempt of one of the multiple threads to access a memory object whose associated access key is held by another one of the multiple threads, and registering a data race in response thereto.

14. The system of claim 13, wherein maintaining the multiple second subsets comprises at least one of:
at a time of entry of one of the multiple threads into one of the one or more critical sections, acquiring, by the thread, any key of the third subset associated with the critical section that is within the first subset at the time of entry, or
upon an attempt by one of the multiple threads to access, within one of the one or more critical sections, a memory object whose associated access key is within the first subset, acquiring the access key by the thread.

15. The system of claim 13, wherein maintaining the one or more second subsets and the one or more third subsets comprises, for each of the one or more critical sections, upon an attempt by one of the multiple threads to access a memory object within the critical section that is not protected by any key of the set of access keys:
assigning one of the keys of the set of access keys to the memory object,
adding the assigned key to the second subset associated with the respective thread, and upon exit of the respective thread from the critical section, adding the assigned key to the third subset associated with the critical section.

16. The system of claim 15, wherein assigning one of the keys of the set of access keys comprises:
assigning an access key from the second subset associated with the respective thread that is not also within a third subset associated with another one of the one or more critical sections, if available, and
otherwise assigning an access key from the first subset, if available, and retracting the assigned access key from any third subset associated with another one of the one or more critical sections that holds the access key.

17. The system of claim 13, the operations further comprising:
maintaining one or more temporary fourth subsets of the set of access keys, each of the temporary fourth subsets being associated with one of the multiple threads and with a section among the one or more critical sections that is being executed by the thread, each of the temporary fourth subsets including all access keys acquired by the respective thread during entering or executing the respective critical section,
wherein maintaining the one or more second subsets and the one or more third subsets comprises, upon exit of one of the multiple threads from one of the one or more critical sections: retracting all access keys within the associated temporary fourth subset from the second subset of access keys associated with the thread, and merging the associated temporary fourth subset with the third subset associated with the respective critical section.

18. The system of claim 13, wherein maintaining the multiple second subsets comprises, upon acquisition of an access key by or retraction of the access key from one of the multiple threads, updating, within a thread-local processor register associated with the respective thread, an access permission for the associated key.

19. The system of claim 13, wherein maintaining the multiple third subsets comprises tracking protected memory objects in the one or more critical sections in a section-object map and tracking access keys associated with the protected memory objects in a page table that maps virtual memory pages storing memory objects to physical memory addresses.

20. One or more non-transitory machine-readable media storing processor-executable instruction for data race detection during execution of a multi-threaded program comprising one or more critical sections, using a set of access keys available to protect memory objects in the one or more critical sections, wherein each memory object is protected by only one of the access keys at a time, the instructions, when executed by a computer processor, causing the computer processor to perform operations comprising:
maintaining, in the one or more machine-readable media, a first subset of the set of access keys, the first subset consisting of access keys currently not held by any of multiple threads and thus available for acquisition;
maintaining, in the one or more machine-readable media, multiple second subsets of the set of access keys, each of the second subsets associated with one of the multiple threads and consisting of access keys held by that thread, the first subset and the multiple second subsets collectively containing all keys of the set of access keys available to protect the memory objects in the one or more critical sections of the program, wherein an access key is removed from the first subset upon acquisition from the first subset by any of the multiple threads and added back to the first subset upon release by that thread;
maintaining, in the one or more machine-readable media, one or more third subsets of the set of access keys, each of the one or more third subsets associated with one of the one or more critical sections of the program, each access key within one of the one or more third subsets being one of the keys of the set of access keys and being associated with a memory object to be accessed within the respective critical section, at least one of the third subsets comprising at least two access keys; and
detecting, by the computer processor, an attempt of one of the multiple threads to access a memory object whose associated access key is held by another one of the multiple threads, and registering a data race in response thereto.

* * * * *